No. 669,423. Patented Mar. 5, 1901.
W. B. MARIS.
CHECK ROW CORN PLANTER.
(Application filed Aug. 13, 1900.)

(No Model.) 2 Sheets—Sheet 1.

Witnesses
C. H. Walker
J. W. Garner

W. B. Maris Inventor
by C. A. Snow & Co.
Attorneys

THE NORRIS PETERS CO., PHOTO-LITHO., WASHINGTON, D. C.

No. 669,423. Patented Mar. 5, 1901.
W. B. MARIS.
CHECK ROW CORN PLANTER.
(Application filed Aug. 13, 1900.)
(No Model.) 2 Sheets—Sheet 2.

Witnesses
C. H. Walker,
J. W. Garner

W. B. Maris Inventor
by C. A. Snow & Co.
Attorneys

THE NORRIS PETERS CO., PHOTO-LITHO., WASHINGTON, D. C.

United States Patent Office.

WHITTEN B. MARIS, OF GILMAN, IOWA.

CHECK-ROW CORN-PLANTER.

SPECIFICATION forming part of Letters Patent No. 669,423, dated March 5, 1901.

Application filed August 13, 1900. Serial No. 26,750. (No model.)

*To all whom it may concern:*

Be it known that I, WHITTEN B. MARIS, a citizen of the United States, residing at Gilman, in the county of Marshall and State of Iowa, have invented a new and useful Check-Row Corn-Planter, of which the following is a specification.

My invention is an improved check-row corn-planter; and it consists in the peculiar construction and combination of devices hereinafter fully set forth, and pointed out in the claims.

The object of my invention is to provide a machine which will automatically plant corn in check-rows without the use of a check-wire and which will enable the operator to ascertain the exact location of the last hill planted at the end of a row and to drive marking-stakes in line therewith to serve as guides in starting to plant the return row.

Figure 1:
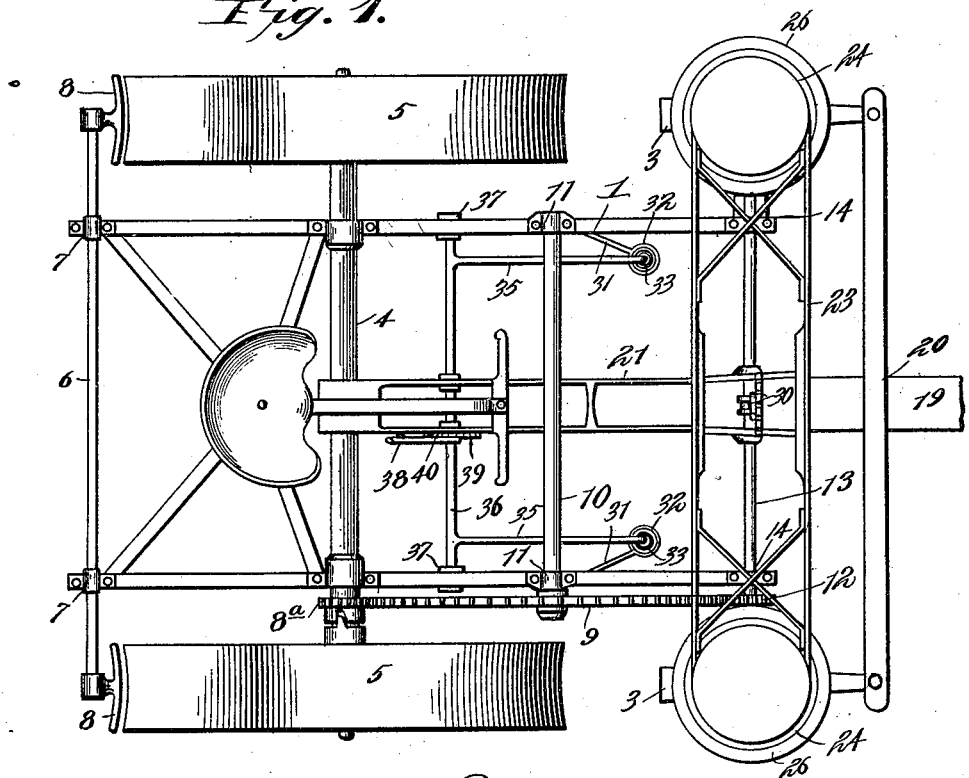
Figure 2:
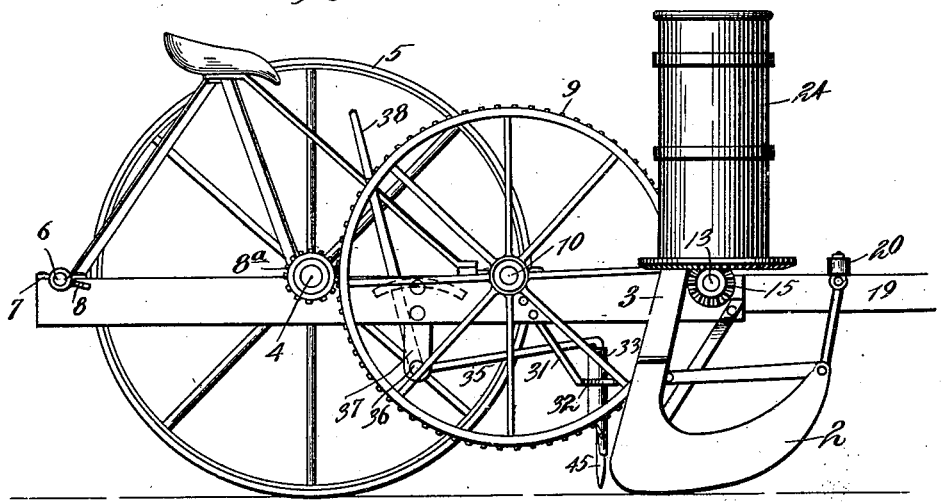
Figure 3:
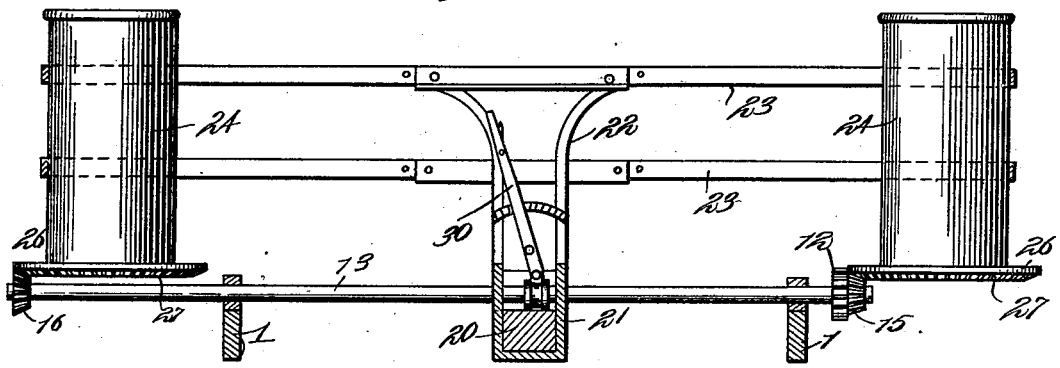
Figure 4:
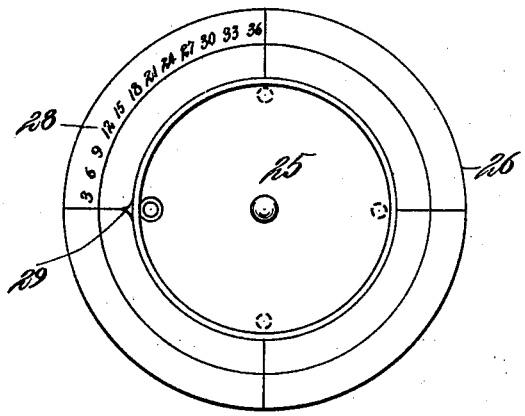
Figures 5, 6:
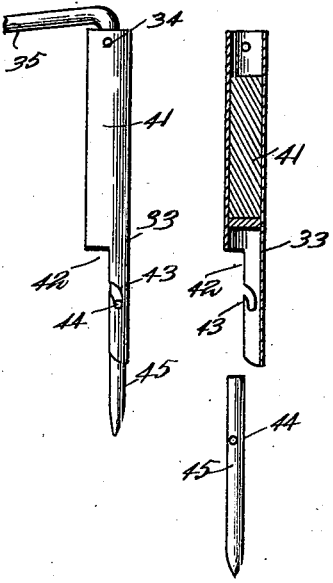

In the accompanying drawings, Figure 1 is a top plan view of a check-row corn-planter embodying my improvements. Fig. 2 is a side elevation of the same. Fig. 3 is a detail sectional view taken on a plane intersecting the bearings of the shaft which is geared to the seed-dropping plates. Fig. 4 is a detail top plan view of one of the seedboxes and the seed-plate therein having the registering-scale. Fig. 5 is a detail side elevation of one of the stake-setting machines, showing the marking-stake therein. Fig. 6 is a sectional view of the same, the marking-stake being removed.

In the embodiment of my invention I provide a frame 1, which may be either of the form here shown or of any other suitable form and which carries a pair of furrow-opening shoes 2, having seed-tubes 3, adapted to discharge seed into the furrows opened by the said shoes. A driving and supporting shaft or axle 4 is journaled in bearings in the sides of frame 1 at a suitable distance from the rear ends thereof, and on the ends of the said shaft are traction and supporting wheels 5, which are preferably provided with broad concave treads. The said traction and supporting wheels are disposed in line with and run in rear of the shoes 2 and serve to cover the seeds dropped in the furrows, as will be understood. A suitable shaft 6 is journaled in bearings 7 at the rear end of frame 1, and said shaft 6 carries scraping-shoes 8, which operate on the treads of the wheels 5 to keep them clear.

A gear-wheel $8^a$ on the shaft 4 rotates with one of the wheels 5 and engages an idler-gear 9 on a shaft 10, which has its bearing on the sides of the frame 1, as at 11. The said wheel 9 engages a gear-wheel 12 on a shaft 13, which also has its bearing in the sides of the frame 1, as at 14. The said shaft is longitudinally movable in its bearing and is provided at its ends with beveled pinions 15 16.

The tongue 19 is secured to the usual cross-bar 20, that connects the front ends of the shoes 2, and the rear end of the said tongue is attached to a bridge-frame 21 of suitable construction, which extends rearward to the shaft 4. From the said bridge-frame, near the front end thereof, hangs a pair of standards 22, to which are secured a transversely-disposed open frame 23, that supports a pair of vertically-disposed cylindrical seed boxes or hoppers 24. The bottoms of the seed boxes or hoppers are provided with the usual seed-cups 25, and under the same operate the circular seed-dropping plates 26. The same are provided on their lower sides with beveled gears 27, adapted to engage the beveled pinions 15 16, and the diameters of the said seed-plates 26 exceed the diameters of the seed boxes or hoppers, said seed-plates projecting angularly beyond the sides of the seed boxes or hoppers and provided on their upper sides with registering numbered scales 28, which in coöperation with marking-fingers 29, with which the seed boxes or hoppers are provided, indicate the distances in inches traversed by the machine since the planting of the last hills of corn. It will be understood that by means of the gearing which connect the seed-disks with the shaft 13 and the gears which connect said shaft 13 to the gear $8^a$ the seed-plates are rotated by the power communicated thereto from the wheel 5 with which the gear $8^a$ rotates. A lever 30 engages the shaft 13 and is adapted to shift the same lengthwise to disengage the wheel 15 from the gear 27 of the proximate seed-plate 26, and thereby throw the said seed-locking mechanism out of gear.

A pair of brackets 31 are secured to and extend inward from the sides of the frame. Rings 32 are formed at the inner ends of the said brackets, which form guides for vertically-movable tubular stake-holders 33, the upper ends of which are flexibly connected, as at 34, to the outer ends of rock-arms 35, which project from the rock-lever 36, that has its bearings in hangers 37, that depend from the sides of the frame 1. A hand-lever 38 is attached to the said rock-shaft, and by means of the same the tubular stake-holders may be raised and lowered in the guide-rings 32, as will be understood. The usual segmental rack 39 and locking-dog 40 are provided to secure the lever 38 in any desired position. The tubular stake-holders are provided with heads 41, and their lower portions are cut away and open on their rear sides, as at 42. Open slots 43 are made in the sides of the lower portion of the tubular stake-holders and serve to engage studs 44, which project from opposite sides of marking-stakes 45, carried in the said stake-holder. The stake-holders are in line with the heels of the seed-sprouts 3, and as the machine reaches the end of a row the operator, as soon as may be after the last hills are planted, operates the hand-lever 38 and causes the stake-holders to descend and set the stakes in the ground, the stakes being left standing in the ground and becoming detached from the stake-holders and clearing the rear open sides thereof, owing to the forward movement of the machine, as will be understood. The machine being stopped as soon as possible after the stakes are set, the distance traversed by the machine after the planting of the last hills in the rows may be ascertained by an inspection of the registering-scales with which the seed-plates are provided, and when the machine has been turned into the next row, before beginning the planting thereof, the marking-stakes, in connection with the registering-scales, serve to permit the machine to be readily adjusted so that the hills of corn will be planted in check-rows.

Having thus described my invention, I claim—

1. In a check-row corn-planter, the combination of the seedboxes, the seed-plates having the registering-scales thereon exterior of the seedboxes, the endwise-movable shaft having gears to engage and disengage said seed-plates, a pinion on said shaft, a traction-wheel, a pinion revoluble with said traction-wheel in one direction, and an idle gear connecting said pinions, substantially as described.

2. In a corn-planter, the combination of a frame having a supporting axle-shaft, a tongue attached to said axle-shaft, a standard attached to said tongue, a transversely-disposed frame carried by said standard, seedboxes carried by said frame, revoluble seed-plates forming the bottoms of said seedboxes, and an operating-shaft having its bearings in said standard and the sides of said frame, said shaft being geared to said seed-plates, substantially as described.

3. In a check-row corn-planter, the combination of the frame having the guides, the rock-shaft having the rock-arms, the stake-holders connected to said rock-arms and disposed in said guides, and marking-stakes carried by said stake-holders, substantially as described.

4. In a check-row corn-planter, the combination of a vertically-movable tubular stake-holder, having rearward-opening slots in its sides, and a marking-stake having projecting studs adapted to be engaged by said slots, substantially as described.

In testimony that I claim the foregoing as my own I have hereto affixed my signature in the presence of two witnesses.

WHITTEN B. MARIS.

Witnesses:
G. D. ELDRIDGE,
JOHN HANCOCK.